March 11, 1930.   W. P. DAY   1,750,510
SHOCK ABSORBER ATTACHMENT
Filed Sept. 9, 1926
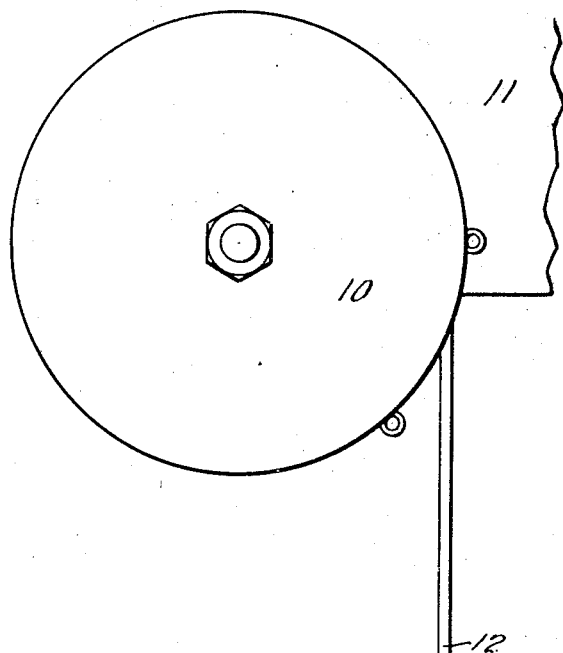
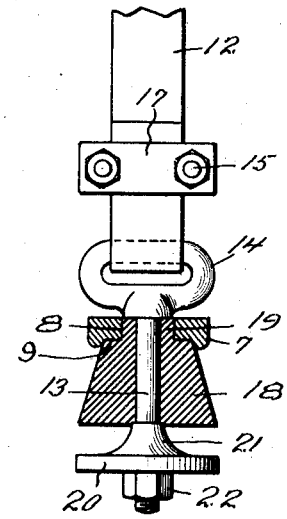
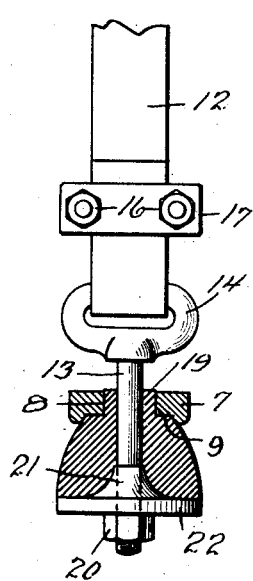
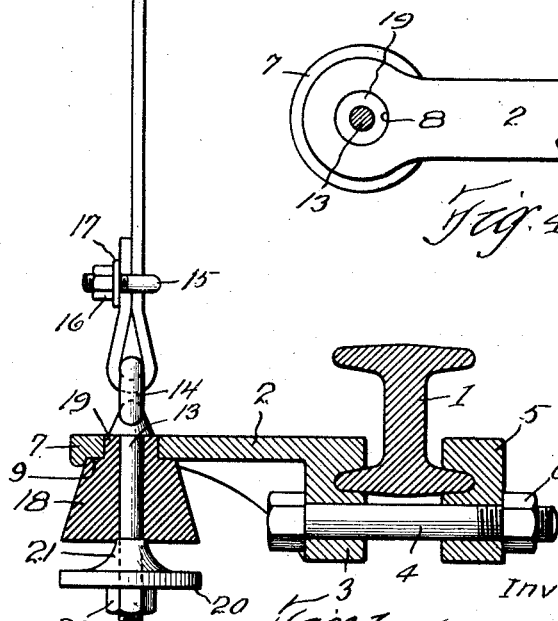
Inventor
William P. Day
By Hull Brock & West
Attorney Patented Mar. 11, 1930

1,750,510

UNITED STATES PATENT OFFICE

WILLIAM PATRICK DAY, OF CLEVELAND HEIGHTS, OHIO

SHOCK-ABSORBER ATTACHMENT

Application filed September 9, 1926. Serial No. 134,415.

This invention relates to axle clamps adapted to be used with shock absorbers such as are interposed between the bodies or frames and the axles of vehicles for the purpose of modifying the effect upon such bodies or frames of shocks due to irregularities in the road beds upon which the vehicle tires travel.

My invention as shown and described herein is designed especially for the use with a "one-way" shock absorber which is intended to check the rebound movement of the body and frame away from the axle without interfering with the straightening or elongating of the vehicle springs when the axle and frame or body approach each other.

Shock absorbers of the type hereinbefore referred to have been markedly efficient when used on automobiles having the ordinary small diameter tires under high inflation. When such shock absorbers are used with the so-called balloon tires of large diameters and low inflation, an entirely different condition exists and while the former shock absorber improves the riding qualities of vehicles equipped with such tires, it has been found that in some instances the relatively short but continuous vibrations transmitted by such tires enable the compression springs in the shock absorbers to take up the slack of their respective straps until the vehicle springs are pulled down to such an extent that they become stiff and rigid; and thereafter such small vibrations or movements are transmitted, practically unaffected, to the vehicle frame and body.

Accordingly I have provided a combined axle clamp and auxiliary shock absorber which will absorb all of the smaller vibrations transmitted by large or low inflated tires, without interfering with the usual shock absorber action which will operate to check the rebound movement of the vehicle due to great or excessive vibrations.

A further object of my invention is to provide an auxiliary shock absorber of the class described in which the operation will be practically noiseless and to provide a cushioning means for the attaching end of the chain or flexible element of the usual shock absorber.

I accomplish the foregoing objects and other objects which will appear hereinafter by the construction illustrated in the accompanying drawings and forming a part hereof wherein Fig. 1 is a view partly in section and partly in side elevation of my improved axle clamp and shock absorber secured to the axle of a vehicle and connected with the usual shock absorber carried by the vehicle frame or body; Fig. 2 is a detail view partly in section and partly in front elevation showing the normal position of the cushion means; Fig. 3 is a similar view showing the cushioning means compressed as it would appear immediately after a somewhat severe shock or vibration; and Fig. 4 is a plan view of the lower side of a part of the clamp.

Referring now to the drawings the numeral 1 designates the axle of a vehicle to which is secured a block 2 having a thickened portion as shown at 3 and which is secured to the axle by means of a stud 4, clamp 5 and nut 6. It is understood however that any suitable means may be employed for securing the block to the axle. The block 2 is provided with an outwardly extending arm 7 having an opening 8 therein and is provided with an annular recess 9 adjacent the opening therein. The numeral 10 designates the casing of the usual shock absorber which is secured to the vehicle frame 11 in any suitable manner and 12 denotes the flexible chain or strap extending from the shock absorber 10 which heretofore has generally been rigidly attached to the axle of the vehicle. According to my invention I provide a stud 13 having an eye 14 to which the flexible strap 12 is secured by means of a clamp 15, washer 17 and nut 16. The stud 13 extends through the opening 8 and secured on the lower end of the same below the extended portion 7 is a block 18 of rubber or other resilient material. The block 18 is of frusto-conical formation and is provided with an annular upwardly extending portion 19 which enters the opening 8, as shown most clearly in Fig. 2, the opening 8 being considerably larger than the stud 13. Secured to and slidable on the lower end of the stud 13 is a disk 20 provided with a conical portion 21 adapted to enter the opening in the resilient block 18. The lower end of the stud 13 is threaded to receive a nut 22 which secures the block 18 and disk 20 against removal from the stud 13.

The block 18 being made of resilient material obviates the difficulty hereinbefore referred to as it allows the vehicle springs to rebound for the comparatively small vibration and prevents these shocks from being transmitted to the usual shock absorber and counteracts any tendency of the usual shock absorber to take up the slack in the straps until the vehicle springs are gradually pulled down to the point where they become stiff and rigid and thereafter allow these minor vibrations to be transmitted to the vehicle body.

When an excessive vibration of the vehicle body occurs the conical portion 21 of the disk 20 enters the aperture in the block 18 and tends to compress and spread the same which therefore modifies the effect of the shock. Due to the fact that the annular upper portion 19 of the block 18 extends through the opening 8 in the arm 7 the eye 14 on the stud 13 is held out of contact with the sides of the opening and at no time does it contact with the arm 7. It will therefore be clear that there will be no rattling of the working parts of the device as no two metal parts contact with each other.

Attention is called to the fact that my device is in the nature of an attachment which may be applied to shock absorbers now in use without any material change or substitution of parts, it being necessary merely to secure my clamp to the axle and insert my resilient connection between the flexible strap and the connection with the block.

It will now be clear that I have provided a device which will accomplish the objects of the invention as hereinbefore stated and which will greatly increase the riding comfort of the vehicle and I wish my invention to be limited only in accordance with the scope of the appended claims.

Having thus described my invention, what I claim is:

1. In combination with a shock absorber of the type having a flexible connection with a vehicle axle, of an auxiliary shock absorbing device comprising an arm adapted to be secured to a vehicle axle and having an opening therethrough, a stud extending through said opening and having its upper end connected with said flexible connection, the lower end of said stud having a frusto-conical resilient block secured thereto and adapted to bear against the lower side of said arm, a disk slidably mounted on the lower end of said stud and having a conical portion adapted to enter the aperture in said resilient block and compress the same and an operative connection between said stud and disk.

2. An attachment for shock absorbers of the class described comprising an arm adapted to be secured to a vehicle axle, said arm having an opening therein, a stud extending through said opening, a resilient block secured on said stud below said arm, a disk mounted on said stud and having an upstanding portion adapted to bear against said resilient block to compress the same and an operative connection between said stud and disk.

3. An attachment of the class described comprising an arm adapted to be secured to a vehicle axle and having an aperture therein, a stud slidably mounted in said aperture, a block of resilient material secured on said stud, said block being of frusto-conical formation the upper end of the same adapted to enter the aperture in said arm, a disk secured on said stud and having a conical portion adapted to enter the aperture in said block and an operative connection between the lower end of said stud and said disk.

4. An attachment for shock absorbers of the class described comprising an arm adapted to be secured to a vehicle axle and having an opening therein, a stud slidably mounted in said opening, a block of resilient material secured on said stud below said arm, said block being of frusto-conical formation and having an annular projection formed thereon adapted to enter said opening, a disk secured adjacent the lower end of said stud below said block and having a conical portion adapted to bear against the lower side of said block and an operative connection between the lower end of said stud and said disk.

5. An attachment for shock absorbers comprising an arm adapted to be secured to a vehicle axle and having an opening therein, a stud slidably mounted in said opening, a block of resilient material secured on said stud below said arm, said block having a projecting portion adapted to enter said opening, a disk secured adjacent the lower end of said stud and adapted to bear against the lower side of said block and to compress the same against said arm and an operative connection between said stud and disk.

6. An attachment for shock absorbers of the class described comprising an arm adapted to be secured to a vehicle axle, said arm having an opening therein, a stud slidably mounted in said opening and adapted to have its upper end connected with the flexible element of the shock absorber, a disk secured adjacent the lower end of said stud, a resilient block surrounding said stud and interposed between said disk and the lower side of said arm and having a projecting portion adapted to enter said opening and to hold said stud out of contact with said arm.

7. An attachment for shock absorbers of the class described comprising an arm adapted to be secured to a vehicle axle, said arm having an opening therein, a stud slidably mounted in said opening and adapted to have its upper end connected with the flexible element of a shock absorber, a disk secured adjacent the lower end of said stud, a resilient block surrounding said stud and interposed between said disk and the lower side of said arm, said block being of frusto-conical formation and having a part adapted to enter said opening.

8. An attachment for shock absorbers of the class described comprising an arm adapted to be secured to a vehicle axle, said arm having an opening therein, a stud slidably mounted in said opening and adapted to have its upper end connected with the flexible element of a shock absorber, a disk secured adjacent the lower end of said stud, a resilient block surrounding said stud and interposed between said disk and the lower side of said arm, said block having a part extending into said opening and holding said stud out of contact with said arm, 9. In a device of the class described comprising in combination, two relatively movable members, a movement resisting device carried by one of said members, a support provided with a recess carried by the other of said members, a yieldable non-metallic member mounted in said recess, a connection from said device extending thru said yieldable member, and a member on said connection adapted to engage the outer surface of said yieldable member.

10. In a device of the class described comprising in combination two relatively movable members, a movement-resisting device carried by one of said members, a support carried by the other of said members and having an opening therein, a stud operatively connected with said movement-resisting device and extending through said opening, a block of yieldable non-metallic material secured on said stud below said support, and a disk secured adjacent the lower end of said stud and adapted to bear against the lower side of said block and to compress the same against said support.

11. In a device of the class described comprising in combination two relatively movable members, a movement-resisting device carried by one of said members, a support carried by the other of said members and having an opening therein, a stud operatively connected with said movement-resisting device and extending through said opening, a block of yieldable non-metallic material secured on said stud below said support, and a disk secured adjacent the lower end of said stud and adapted to bear against the lower side of said block and to compress the same against said support, said block having an upstanding portion thereon disposed so as to enter said opening and to maintain said stud out of contact with the edges of said opening.

12. In a device of the character described comprising in combination two relatively movable members, a movement-resisting device carried by one of said members, a metallic arm carried by the other of said members and having an opening therein, a metallic stud operatively connected with said movement-resisting device and extending through said opening, a yieldable non-metallic member surrounding the lower end portion of said stud and serving to maintain said stud out of contact with the edges of said opening, and an operative connection between said stud and said non-metallic member.

In testimony whereof, I hereunto affix my signature.

WILLIAM PATRICK DAY.